US011320553B2

(12) United States Patent
Gunderson et al.

(10) Patent No.: US 11,320,553 B2
(45) Date of Patent: May 3, 2022

(54) SYSTEM AND METHOD FOR SUBSURFACE STRUCTURAL INTERPRETATION

(71) Applicant: Chevron U.S.A. Inc., San Ramon, CA (US)

(72) Inventors: Kellen Leigh Gunderson, Houston, TX (US); Chris Anthony Guzofski, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/912,703

(22) Filed: Jun. 25, 2020

(65) Prior Publication Data

US 2021/0405234 A1 Dec. 30, 2021

(51) Int. Cl.
*G01V 1/30* (2006.01)

(52) U.S. Cl.
CPC .............. *G01V 1/301* (2013.01); *G01V 1/303* (2013.01); *G01V 2210/6222* (2013.01); *G01V 2210/667* (2013.01)

(58) Field of Classification Search
None
See application file for complete search history.

(56) References Cited

U.S. PATENT DOCUMENTS

| | | |
|---|---|---|
| 8,694,262 B2 | 4/2014 | Schultz et al. |
| 8,798,974 B1 | 8/2014 | Nunns |
| 2004/0210394 A1* | 10/2004 | Trappe ............... G01V 1/32 702/14 |
| 2010/0241410 A1* | 9/2010 | McElhinney ........ E21B 43/305 703/10 |
| 2010/0332442 A1* | 12/2010 | Goel ..................... G06N 7/02 706/52 |
| 2013/0121111 A1 | 5/2013 | Kim |

OTHER PUBLICATIONS

Wellmann et al. ("Effect of Geological Data Quality on Uncertainties in Geological Models and Subsurface Flow Fields" (Feb. 2012) Thirty-Seventh Workshop on Geothermal Reservoir Engineering). (Year: 2012).*
Clare E. Bond, "Uncertainty in structural interpretation: Lessons to be learnt", Journal of Structural Geology, 74, 2015, pp. 185-200, Elsevier Ltd.

(Continued)

*Primary Examiner* — Roy Y Yi
(74) *Attorney, Agent, or Firm* — Marie L. Clapp

(57) ABSTRACT

A method is described for assessing subsurface structure uncertainty based on at least one subsurface horizon. The method calculates seismic continuity attributes to determine a mappability of the subsurface horizon(s); determines horizontal uncertainty for each fault in vertical uncertainty for each horizon; generates probabilistic scenarios for a subsurface geometry for at least one conceptual model; and generates a map of geological model uncertainty based on the probabilistic scenarios. In some embodiments, the probabilistic scenarios are stochastic simulations. In some embodiments, generating a map of geological model uncertainty is based on information entropy. The method may be executed by a computer system.

7 Claims, 6 Drawing Sheets

(56) References Cited

OTHER PUBLICATIONS

J. Florian Wellmann et al., "Uncertainties have a meaning: Information entropy as a quality measure for 3-Dgeological models", Tectonophysics, 526-529, 2012, pp. 207-216, Elsevier Ltd.
C.E. Shannon, "A Mathematical Theory of Communication", Reprinted with corrections from The Bell System Technical Journal, vol. 27, July, Oct. 1948, pp. pp. 379-423, 623-656.
PCT International Search Report and Written Opinion, dated Sep. 17, 2021, issued in International Application No. PCT/IB2021/055524, filed on Jun. 23, 2021, 12 pages.

* cited by examiner

SYSTEM AND METHOD FOR SUBSURFACE STRUCTURAL INTERPRETATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for assessing structural interpretations of the earth's subsurface and, in particular, to a method of quantifying subsurface structural interpretation uncertainty.

BACKGROUND

Subsurface resource and risk assessments are made using structure contour maps created from the interpretation of seismic and well data. The uncertainty in these structure contour maps is not properly characterized because there is no process for quantifying and communicating all the uncertainties resulting from the assumptions and decisions interpreters make when creating these maps. Typically, structural uncertainty is simply quantified as the velocity uncertainty of the seismic data, for which exists well-defined, standard workflows. However, uncertainty in seismic velocity is only one component of structural uncertainty that is represented in a structure contour map. For instance, different subsurface interpreters may create completely different maps from the same seismic data based off their experience and different conceptual geological models for what the subsurface geology looks like. Another example is that due to poor seismic image quality, there can be equally valid interpretations for where structural features like faults exist in 3D space. Neither of these conceptual or interpretative uncertainties are accounted for in the traditional velocity uncertainty workflow.

The ability to define the structure in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for quantifying uncertainty of subsurface structural interpretations of potential hydrocarbon reservoirs.

SUMMARY

In accordance with some embodiments, a method of assessing subsurface structure uncertainty including receiving at least one digital subsurface image including at least one horizon; calculating seismic continuity attributes for the at least one digital seismic image; determining a mappability of the at least one digital subsurface image based on the seismic continuity attributes; determining a horizontal uncertainty for each fault in the at least one digital subsurface image and a vertical uncertainty for each horizon in the one or more digital subsurface images; generating probabilistic scenarios for a subsurface geometry for at least one conceptual model based on the horizontal uncertainty for each fault and the vertical uncertainty for each horizon; generating a map of geological model uncertainty based on the probabilistic scenarios; and displaying the map of geological model uncertainty on a graphical user interface is disclosed. In some embodiments, the probabilistic scenarios are stochastic simulations. In some embodiments, generating a map of geological model uncertainty is based on information entropy.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of understanding subsurface structural interpretations. These embodiments are designed to be of particular use for assessing uncertainties in subsurface structural interpretations.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention is a process that accounts for all aspects of structural uncertainty—velocity/imaging, interpretative, and conceptual to quantify and communicate structural interpretation uncertainty in subsurface structure contour maps. This process is novel in at least two ways: first, in that it presents a way to quantify uncertainty in the conceptual geologic models on which many subsurface structural interpretations rely and second, it links together three different aspects of structural interpretation uncertainty in a way to present a holistic quantification of the different aspects of uncertainty.

Figure 1:
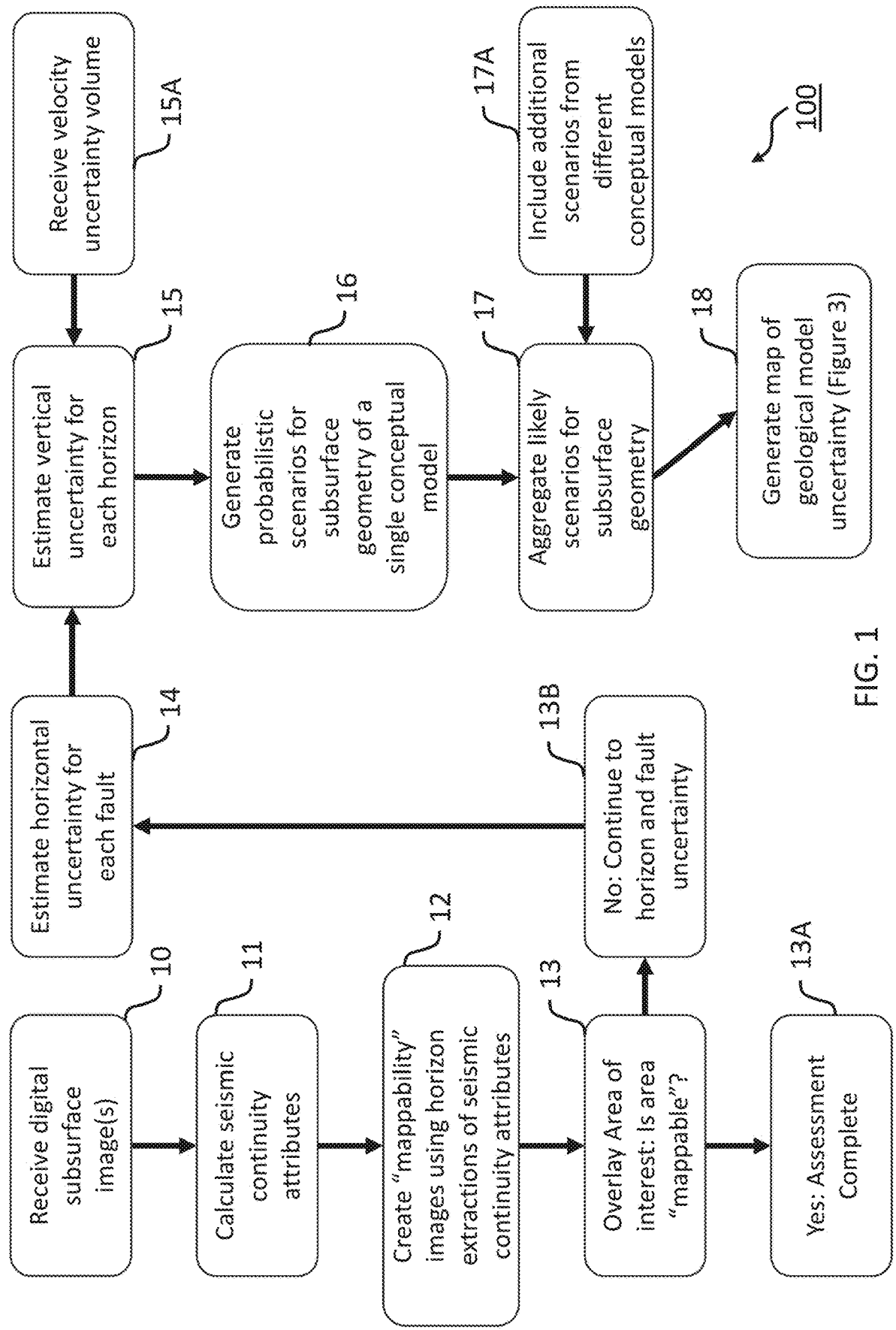
FIG. 1 illustrates a flowchart of a method of quantifying uncertainty of subsurface structural interpretations, in accordance with some embodiments.

FIG. 1 illustrates a flowchart of a method 100 for quantifying uncertainty of subsurface structural interpretations. At operation 10, one or more digital subsurface images are received. These digital subsurface images include at least one horizon which may be interpreted from seismic images that may be, by way of example but not limitation, seismic images generated by seismic imaging methods such as time migration, depth migration, or reverse time migration. In another embodiment, the digital subsurface image(s) may be a seismic image including interpretations of horizons of interest (e.g., seismic events believed to be associated with particular subsurface formations) and/or faults. The digital subsurface images are then evaluated to determine the mappability of the horizons and the uncertainty of the horizons and faults.

At operation 11, method 100 calculates seismic continuity attributes. By way of example and not limitation, seismic continuity attributes may include measures of coherence, variance, and dip consistency. Seismic continuity attributes may include any type of attribute that measures the similarity of the seismic waveform from trace to trace. Those of skill in the art will be familiar with many ways to calculate seismic continuity attributes.

Operation 12 creates "mappability" images using horizon extractions of the seismic continuity attributes. The mappability is a measure of uncertainty and is quantified using the seismic continuity attributes that measure continuity of seismic events on adjacent traces. These seismic continuity attributes are extracted for a mapped horizon and are scaled, for example, using a red-yellow-green color bar to represent areas of low-medium-high mappability. For example, areas of high seismic coherence, low variance, or high dip consistency are considered highly "mappable", meaning that the solutions are constrained by high-quality data and have lower structural interpretation uncertainty. Areas of interest are then overlain on the attribute extraction maps at operation 13 to determine if horizon and fault uncertainty should be calculated if the areas of interest are in low "mappability" regions. If operation 13 determines the area is mappable, the assessment is complete (operation 13A), meaning that the structural uncertainty is low. If the area is not mappable, method 100 continues to compute the horizon and fault uncertainty (operation 13B).

Figure 2:
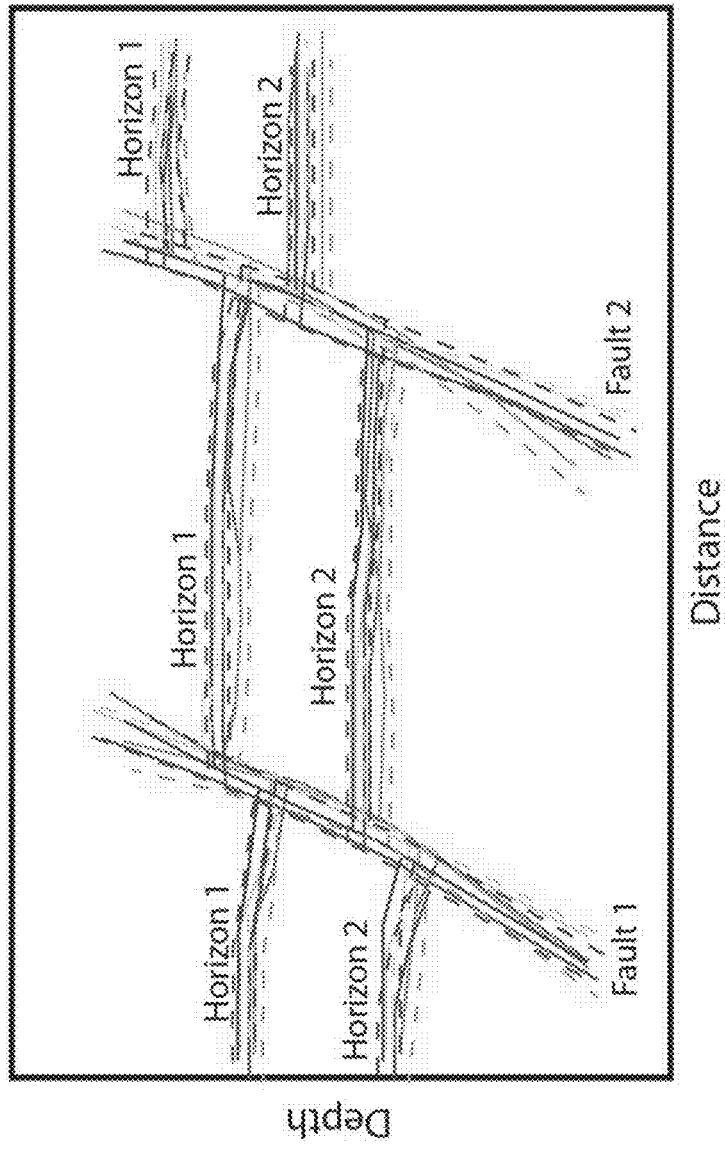
FIG. 2 demonstrates a result of a step of a method of quantifying uncertainty of subsurface structural interpretations, in accordance with some embodiments.

Operations 14 and 15 estimate the horizontal uncertainty for each fault and the vertical uncertainty for each horizon, respectively. However, fault and horizon uncertainties are independent of each other and may be estimated in either order or simultaneously. Operation 15 might use additional input of a velocity uncertainty volume 15A if available. Velocity uncertainty volumes are estimates of depth uncertainty due to varying seismic velocity fields and are generated via standard practice seismic processing workflows known to those of skill in the art. For each fault a horizontal spatial uncertainty range and for each horizon a vertical uncertainty range are defined. These ranges can be defined using standard uncertainty distributions (e.g. Gaussian) or customized distributions from velocity or imaging uncertainty analysis. The output is a stochastic simulation of potential horizon and fault positions that honor the input data. However, each of these simulation outputs must honor a single conceptual geological model, meaning that they must have the same number of faults, linked faults will remain linked, fault displacement profiles will be similar, etc. This uncertainty measurement only presents the range of interpretational uncertainty for a given conceptual geological model. An example of the result of operations 14 and 15 may be seen in FIG. 2. When multiple horizons and faults are included, as seen in FIG. 2, each fault and horizon is shifted by random horizontal and vertical values, according to the predefined distributions, independently of each other. The results are independent 3D fault and horizon frameworks from which structure maps are created. Multiple realizations of the structure map are used to determine the uncertainty in petroleum trap area or fault block size for a given conceptual geological model.

Figure 3:
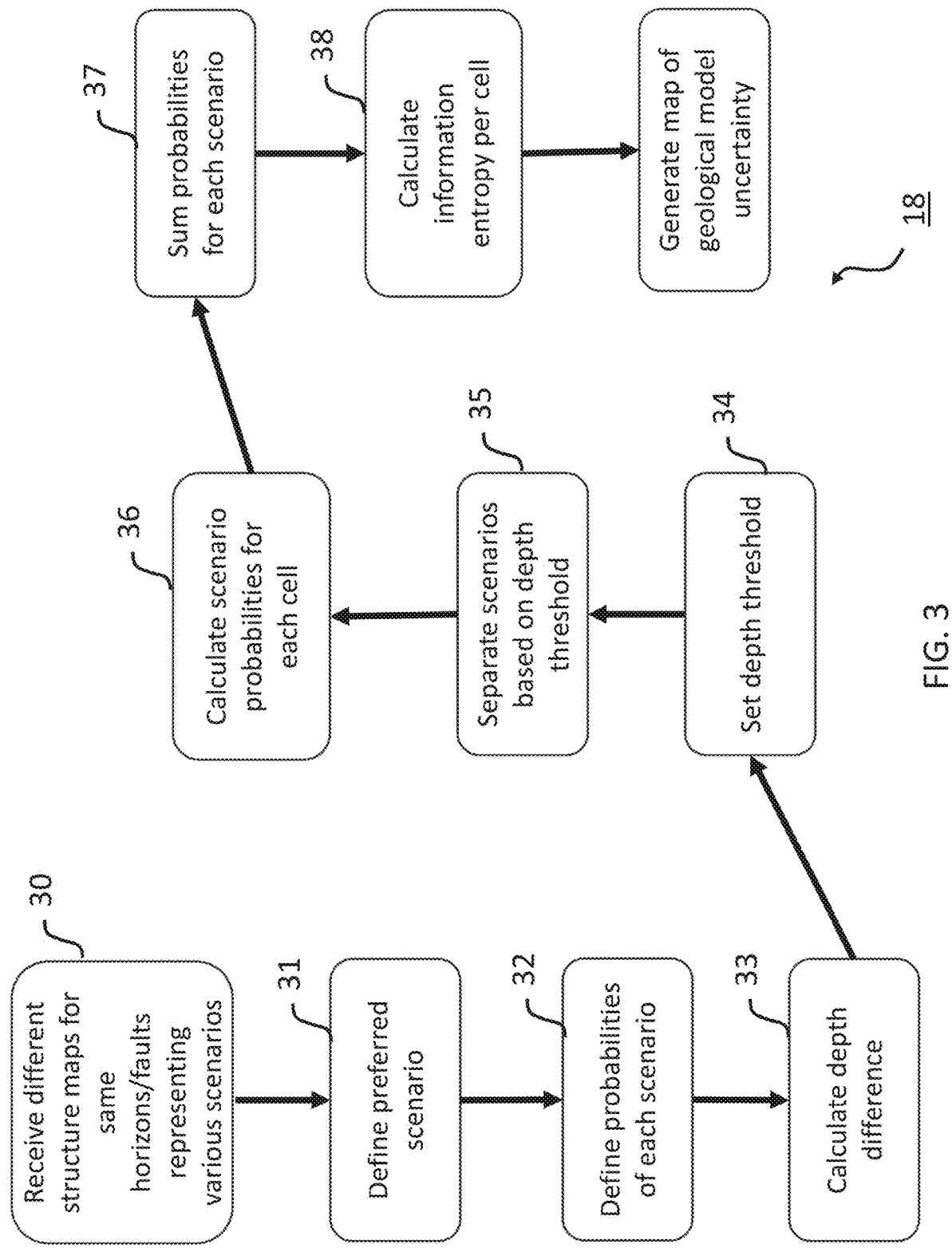
FIG. 3 illustrates a flowchart of a step of a method of quantifying uncertainty of subsurface structural interpretations, in accordance with some embodiments.

Referring again to FIG. 1, the mappability of the digital seismic images and the uncertainty of the horizons and faults is used at operation 16 to generate a map of geological model uncertainty. At operation 16, the method 100 generates probabilistic scenarios for the subsurface geometry of a single conceptual model. This is done by stochastic simulations, which, by way of example and not limitation, may be Monte Carlo simulations. Uncertainty distributions for the position of each geologic element in the model, such as faults and horizons, are defined by the user. The simulation then randomly samples within each defined distribution creates a distinct geologic model scenario encompassing all the model elements that honors geologic principles, such as superposition, cross cutting relationships, fault type, etc. It can be repeated for each of the other conceptual models (operations 17A) in which case the method 100 aggregates (collects) likely scenarios for the subsurface geometry (operation 17). The scenarios can be evaluated along with other independent scenarios from separate conceptual models to generate a map of geological model uncertainty (operation 18). The details of operation 18 are illustrated in FIG. 3. Here the geological model uncertainty is quantified via the creation of conceptual geological uncertainty maps using information entropy theory. Information entropy is a concept from information theory that tells how much uncertainty there is in an event. In general, the more certain or deterministic an event is, the less entropy it will contain. It is calculated by summing the products of probabilities for each possible outcome with its logarithm.

Figure 4:
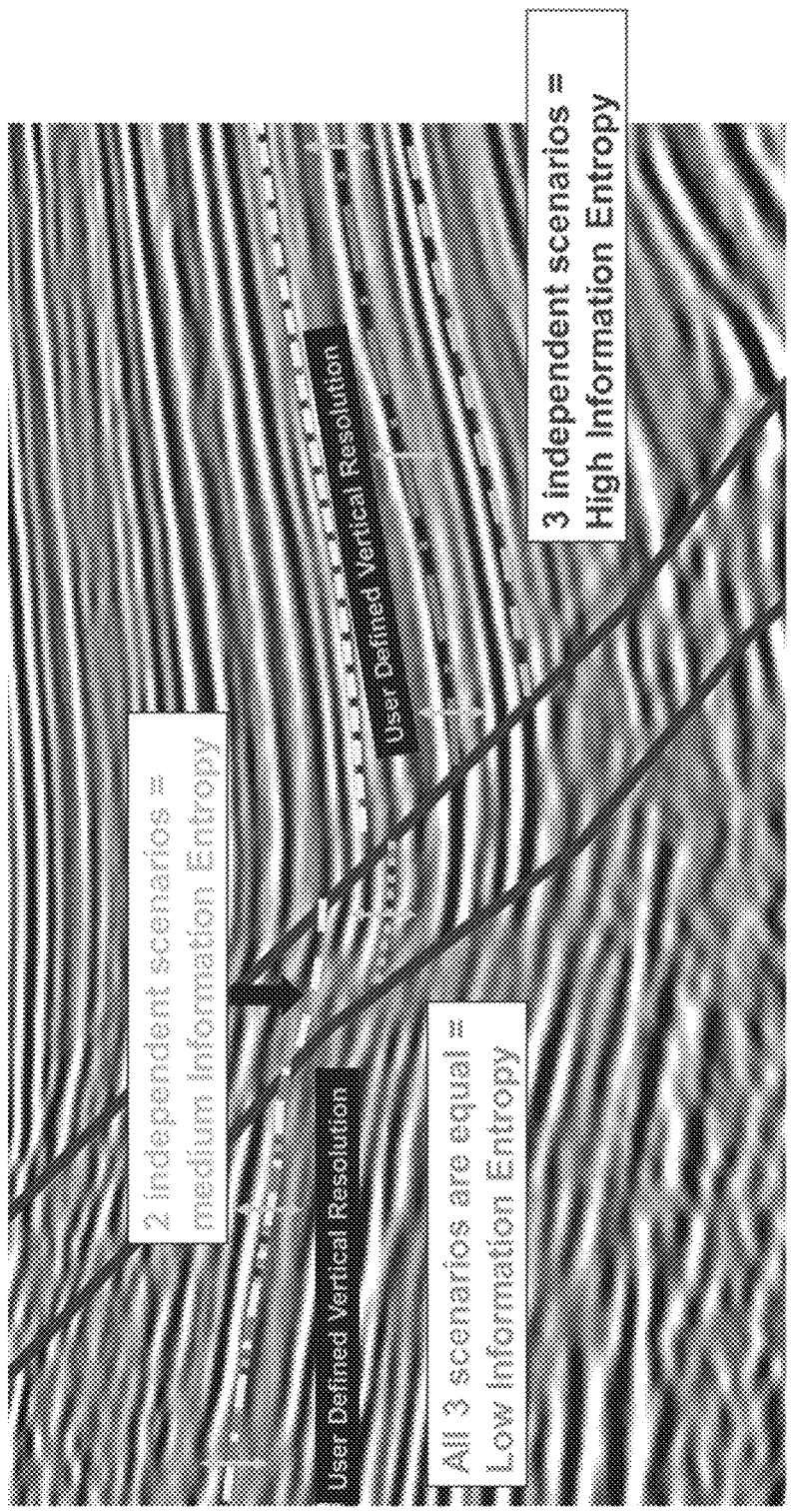
FIG. 4 demonstrates a result of a step of a method of quantifying uncertainty of subsurface structural interpretations, in accordance with some embodiments.
Figure 5:
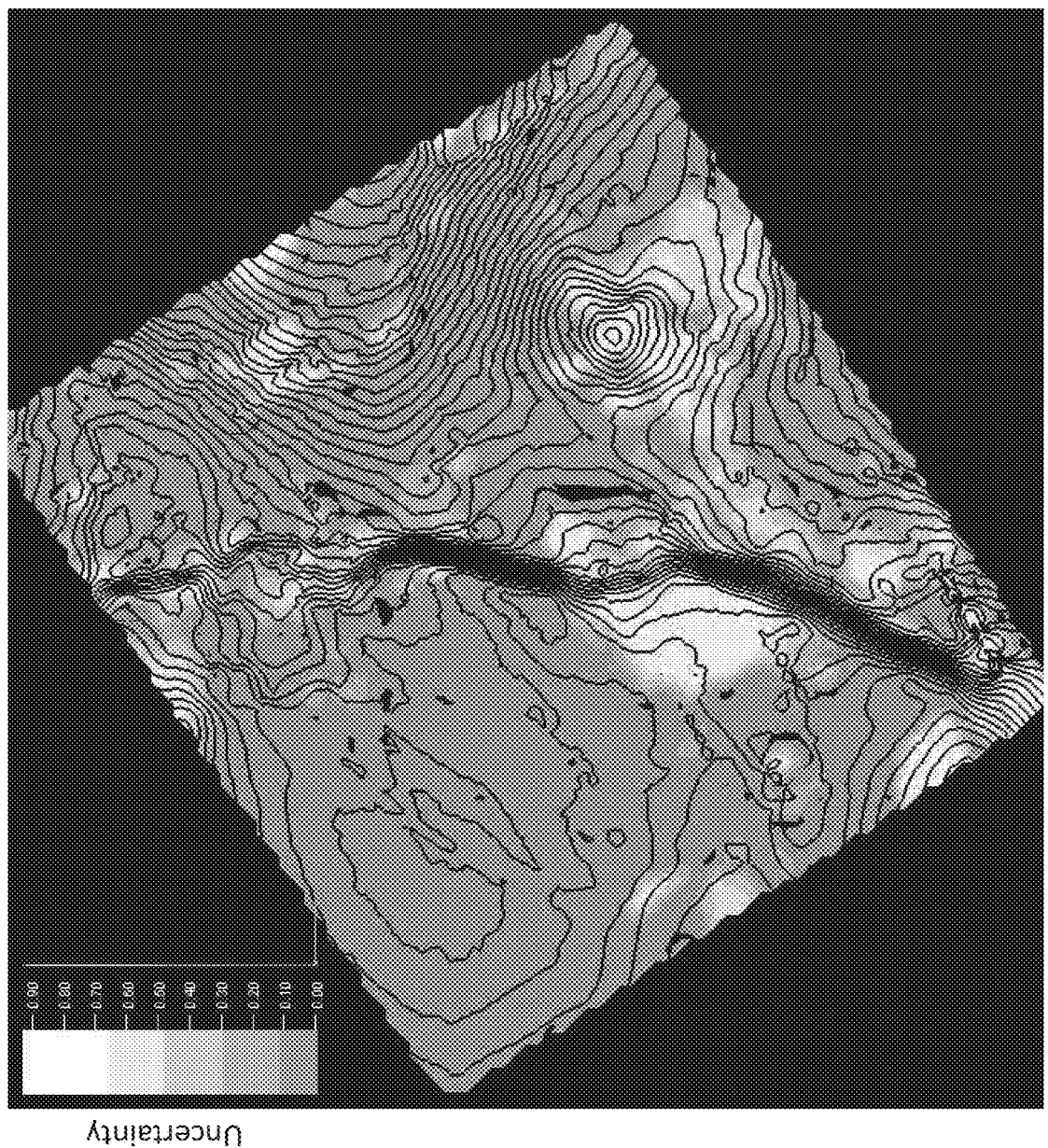
FIG. 5 is an example of a result of a method of quantifying uncertainty of subsurface structural interpretations, in accordance with some embodiments.

In the workflow illustrated in FIG. 3, the user creates or collects multiple structure maps that were constructed using different conceptual geological models. At operation 30, the different structure maps for the same horizons and/or faults representing various conceptual scenarios are received. These maps may be generated, for example, using the probabilistically generated scenarios in method 100 of FIG. 1 and/or using additional structure maps generated by traditional seismic mapping techniques. The maps comprise a regular grid of x-y locations with a z (depth or time) value attached to each x-y location and might differ in the number of faults, correlation of horizons across faults, fault connectivity, etc. Referring again to FIG. 3, at operation 31 a preferred model scenario may be selected by the user or by the computer. Operation 32 assigns probabilities for each scenario as being the correct one. These probabilities are determined based on the user's geological experience and expertise. At operation 33, the depth differences between the preferred scenario and each alternative model are calculated for each regularly spaced x-y location on a structure map grid. At operation 34, a depth threshold based on seismic vertical resolution is set using the average frequency of the seismic data at the horizon. The vertical distance between peaks on a seismic wavelet is considered to be the vertical seismic resolution. At operation 35, for each x-y location in the structure map grid, the scenarios will be separated for that cell based on the depth threshold (demonstrated, for example, in FIG. 4 where the vertical resolution is indicated). At operation 36, probabilities at each x-y location within the threshold are generated using the user-defined scenario probability. At operation 37, the scenario probabilities are summed to calculate information entropy (operation 38) for each grid cell. Information entropy, or conceptual uncertainty, for the different structure maps can then be mapped spatially. The result of operation 38 is a map of geological model uncertainty such as the one shown in FIG. 5. FIG. 5 is a map (x-y plane) that shows the contours associated with a particular horizon; the shading indicates the amount of information entropy (i.e. uncertainty). The highest uncertainty is, unsurprisingly, near the greatest structural changes. The uncertainty map can inform the range in potential resource size and the geometry risk in pre-drill resource and risk assessments.

Figure 6:
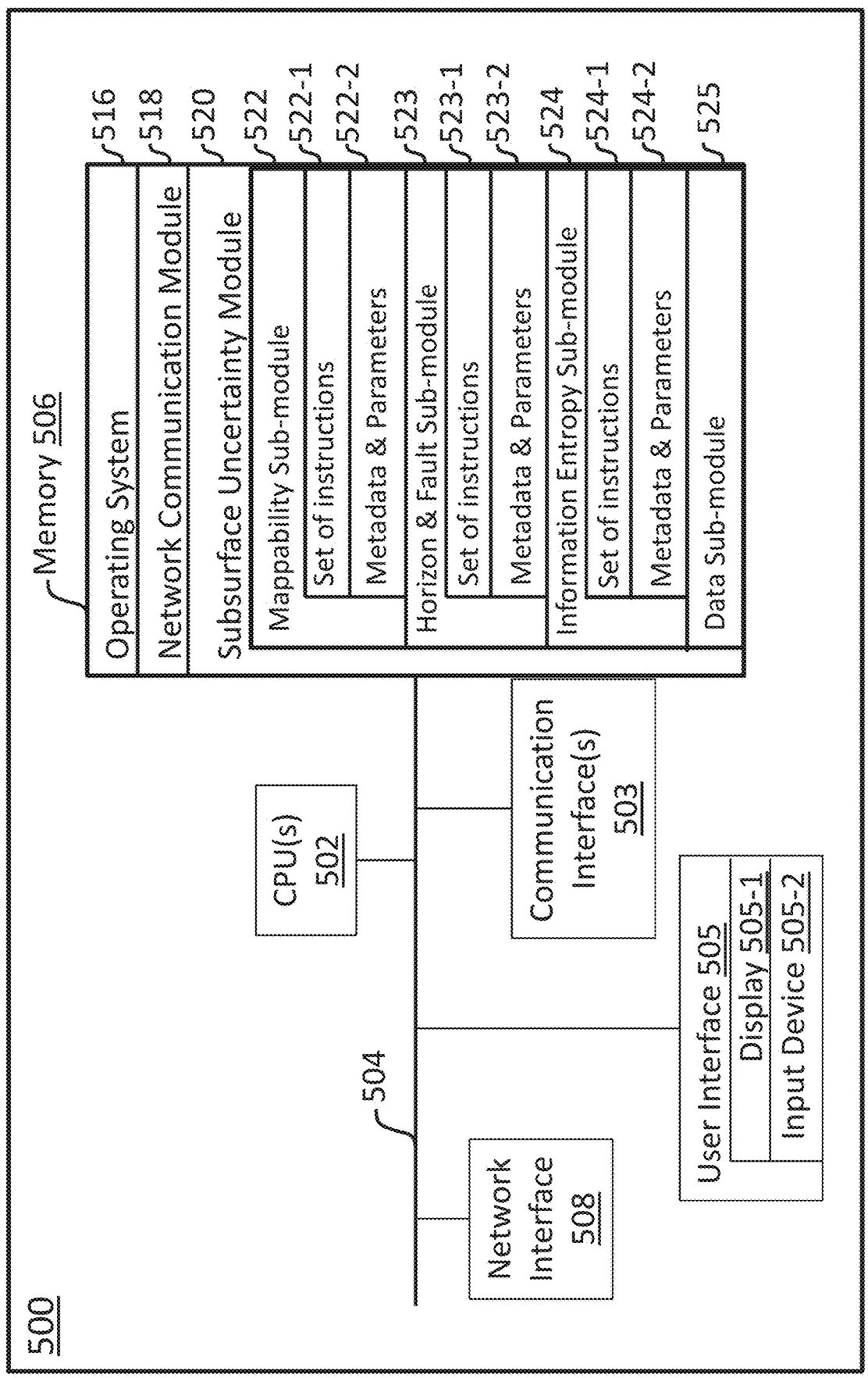
FIG. 6 is a block diagram illustrating a subsurface uncertainty system, in accordance with some embodiments.

FIG. 6 is a block diagram illustrating a subsurface uncertainty system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the subsurface uncertainty system 500 includes one or more processing units (CPUs) 502, one or more network interfaces 508 and/or other communications interfaces 503, memory 506, and one or more communication buses 504 for interconnecting these and various other components. The subsurface uncertainty system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, seismic interpretations, and/or geologic structure information.

In some embodiments, memory 506 or the non-transitory computer readable storage medium of memory 506 stores the following programs, modules and data structures, or a subset thereof including an operating system 516, a network communication module 518, and a subsurface uncertainty module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the subsurface uncertainty module 520 executes the operations of method 100. Subsurface uncertainty module 520 may include data sub-module 525, which handles the digital subsurface images and other data required for method 100. This data is supplied by data sub-module 525 to other sub-modules.

Mappability sub-module 522 contains a set of instructions 522-1 and accepts metadata and parameters 522-2 that will enable it to execute operations 11-13 of method 100. The horizon and fault sub-module 523 contains a set of instructions 523-1 and accepts metadata and parameters 523-2 that will enable it to contribute to operations 14 and 15 of method 100. The information entropy sub-module 524 contains a set of instructions 524-1 and accepts metadata and parameters 524-2 that will enable it to execute at least operations 16-18 of method 100, including the operations described in FIG. 3. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the images. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 6) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for assessing uncertainty of the structure of the earth's subsurface, comprising:
   a. receiving, at a computer processor, at least one digital subsurface image including at least one horizon;
   b. calculating seismic continuity attributes for the at least one digital seismic image;
   c. determining a mappability of the at least one digital subsurface image based on the seismic continuity attributes by extracting the seismic continuity attributes for the at least one horizon and scaling to identify areas of low, medium, or high mappability;
   d. for areas that are low mappability, determining a horizontal uncertainty for each fault in the at least one digital subsurface image and a vertical uncertainty for each horizon in the one or more digital subsurface images;
   e. generating probabilistic scenarios for a subsurface geometry for at least one conceptual model based on the horizontal uncertainty for each fault and the vertical uncertainty for each horizon;
   f. generating a map of geological model uncertainty based on the probabilistic scenarios wherein the generating the map of geological model uncertainty comprises:
      selecting a preferred model scenario from the probabilistic scenarios;
      assigning probabilities for each of the probabilistic scenarios;
      calculating depth differences between the preferred model scenario and each of the probabilistic scenarios;
      for each x-y location in the probabilistic scenarios, separating the probabilistic scenarios for that x-y location based on a depth threshold;
      generating location probabilities at each x-y location within the depth threshold based on the assigned probabilities for each of the probabilistic scenarios within the depth threshold; and
      summing the location probabilities to calculate information entropy for each x-y location; and
   g. displaying the map of geological model uncertainty on a graphical user interface.

2. The method of claim 1 further comprising using the map of geological model uncertainty to calculate a range in potential resource size and subsurface geometry risk.

3. The method of claim 1 wherein the generating the probabilistic scenarios comprises stochastic simulations.

4. A computer system, comprising:
   one or more processors;
   memory; and
   one or more programs, wherein the one or more programs are stored in the memory and configured to be executed by the one or more processors, the one or more programs including instructions that when executed by the one or more processors cause the system to:
   a. receive, at the one or more processors, at least one digital subsurface image including at least one horizon;
   b. calculate seismic continuity attributes for the at least one digital seismic image;
   c. determine a mappability of the at least one digital subsurface image based on the seismic continuity attributes by extracting the seismic continuity attributes for the at least one horizon and scaling to identify areas of low, medium, or high mappability;
   d. for areas that are low mappability, determine a horizontal uncertainty for each fault in the at least one digital subsurface image and a vertical uncertainty for each horizon in the one or more digital subsurface images;
   e. generate probabilistic scenarios for a subsurface geometry for at least one conceptual model based on the horizontal uncertainty for each fault and the vertical uncertainty for each horizon;
   f. generate a map of geological model uncertainty based on the probabilistic scenarios wherein the generating the map of geological model uncertainty comprises:
      selecting a preferred model scenario from the probabilistic scenarios;
      assigning probabilities for each of the probabilistic scenarios;

calculating depth differences between the preferred model scenario and each of the probabilistic scenarios;

for each x-y location in the probabilistic scenarios, separating the probabilistic scenarios for that x-y location based on a depth threshold;

generating location probabilities at each x-y location within the depth threshold based on the assigned probabilities for each of the probabilistic scenarios within the depth threshold; and summing the location probabilities to calculate information entropy for each x-y location; and g. display the map of geological model uncertainty on a graphical user interface.

5. The system of claim 4 wherein the generating the probabilistic scenarios comprises stochastic simulations.

6. A non-transitory computer readable storage medium storing one or more programs, the one or more programs comprising instructions, which when executed by an electronic device with one or more processors and memory, cause the device to:

a. receive, at the one or more processors, at least one digital subsurface image including at least one horizon;

b. calculate seismic continuity attributes for the at least one digital seismic image;

c. determine a mappability of the at least one digital subsurface image based on the seismic continuity attributes by extracting the seismic continuity attributes for the at least one horizon and scaling to identify areas of low, medium, or high mappability;

d. for areas that are low mappability, determine a horizontal uncertainty for each fault in the at least one digital subsurface image and a vertical uncertainty for each horizon in the one or more digital subsurface images;

e. generate probabilistic scenarios for a subsurface geometry for at least one conceptual model based on the horizontal uncertainty for each fault and the vertical uncertainty for each horizon;

f. generate a map of geological model uncertainty based on the probabilistic scenarios wherein the generating the map of geological model uncertainty comprises:

selecting a preferred model scenario from the probabilistic scenarios;

assigning probabilities for each of the probabilistic scenarios;

calculating depth differences between the preferred model scenario and each of the probabilistic scenarios;

for each x-y location in the probabilistic scenarios, separating the probabilistic scenarios for that x-y location based on a depth threshold;

generating location probabilities at each x-y location within the depth threshold based on the assigned probabilities for each of the probabilistic scenarios within the depth threshold; and summing the location probabilities to calculate information entropy for each x-y location; and g. display the map of geological model uncertainty on a graphical user interface.

7. The non-transitory computer readable storage medium of claim 6 wherein the generating the probabilistic scenarios comprises stochastic simulations.

* * * * *